No. 831,751. PATENTED SEPT. 25, 1906.
J. N. SNYDER.
TRUCK.
APPLICATION FILED NOV. 28, 1905.
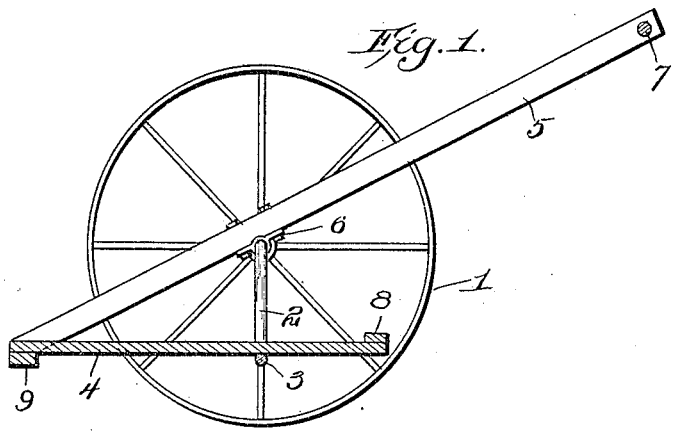
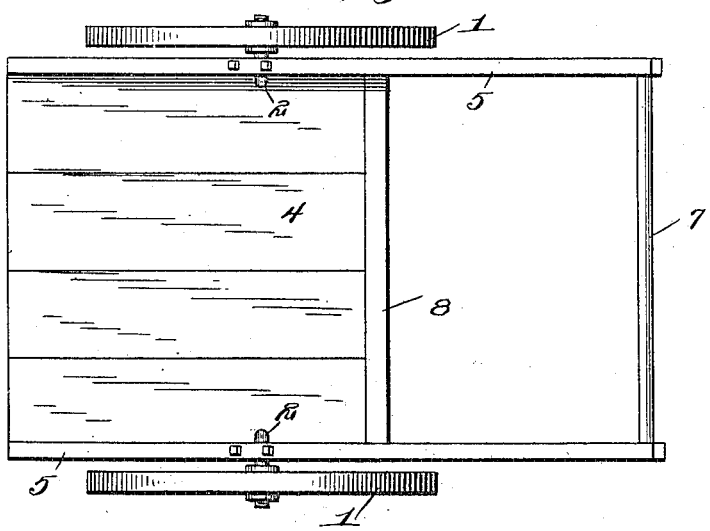
Inventor
John N. Snyder

UNITED STATES PATENT OFFICE.

JOHN N. SNYDER, OF FLORA, ILLINOIS.

TRUCK.

No. 831,751.  Specification of Letters Patent.  Patented Sept. 25, 1906.

Application filed November 28, 1905. Serial No. 289,459.

*To all whom it may concern:*

Be it known that I, JOHN N. SNYDER, a citizen of the United States, residing at Flora, in the county of Clay and State of Illinois, have invented certain new and useful Improvements in Trucks; and I do hereby declare the following to be a full, clear, and exact description of the invention, such as will enable others skilled in the art to which it appertains to make and use the same.

My invention relates to trucks for moving boxes, barrels, milk-cans, and the like; and its object is to provide a device of this character having its platform close to the ground and of large capacity, said platform, however, being easily balanced and the entire device being so constructed as to be readily manipulated.

The invention consists of large wheels supporting a drop-axle which extends under a platform near its center and holds it close to the ground. Side bars extend from the forward end of the platform and have bearings through which the axle extends, and these side bars are connected to constitute a handle.

The invention also consists of the further novel features of construction and combination of parts, the preferred form whereof will be hereinafter more clearly set forth, and pointed out in the claim.

In the accompanying drawings I have shown the preferred form of my invention.

In said drawings, Figure 1 is a vertical longitudinal section through the truck, and Fig. 2 is a plan view thereof.

Referring to the figures by numerals of reference, 1 1 are large wheels in which is mounted a drop-axle 2, the intermediate portion 3 of which is straight and lies close to the ground. This intermediate portion extends under and is secured to the platform 4 and is located adjacent the center of said platform. Side bars 5 are suitably fastened to the front end of the platform at the sides thereof, and these bars rest upon the axle close to the wheels and are connected thereto by bearings 6. The bars extend a suitable distance in rear of the wheels and are connected by a cross-bar 7, which constitutes a handle. A reinforcing-cleat 8 is located on the platform at its rear edge, and another similar reinforcing device 9 is secured under the platform at its forward edge. The parts are so proportioned that the handle 7 will assume a position whereby a person of ordinary height can readily hold the platform 4 in horizontal position.

When it is desired to load the truck, the platform is tilted downward by raising handle 7, and trunks, milk-cans, &c., can be readily slid thereon and against the cleat 8. As the axle 3 is close to the center of the platform, said platform can be readily swung upward into horizontal position by pulling downward upon handle 7, and as the wheels 1 are of large size the truck can be easily pushed over uneven surfaces.

The truck is formed of very few parts, is extremely compact, though of large capacity, and as it is fully balanced it does not require the use of any supplementary supports, such as front wheels, &c. It is particularly desirable for farmers for transporting cans and other bulky devices along roads where only a truck with large wheels can be used.

Having thus fully described my invention, what I claim as new, and desire to secure by Letters Patent, is—

In a truck the combination with wheels and a drop-axle supported thereby; of a platform mounted upon the dropped portion of said axle, a cleat at the rear edge and upon the upper side of said platform to form a stop, a similar cleat at the front end of said platform and on the under side thereof, side bars secured to the wheel-engaging portions of said axle between said wheels, said bars being in alinement with the outer edges of said platform and having their forward ends secured thereto and a cross-bar connecting the rear ends of said bars and forming a handle, said parts being so arranged upon the axle that they will balance and the platform remain in a horizontal position.

In testimony whereof I have signed my name to this specification in the presence of two subscribing witnesses.

JOHN N. SNYDER.

Witnesses:
 G. H. SEELIWELL,
 H. E. LITTER.